(12) United States Patent
Fu et al.

(10) Patent No.: US 6,226,763 B1
(45) Date of Patent: May 1, 2001

(54) METHOD AND APPARATUS FOR PERFORMING CACHE ACCESSES

(75) Inventors: John Wai Cheong Fu, Saratoga, CA (US); Dean Ahmad Mulla, Fort Collins, CO (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 09/126,029

(22) Filed: Jul. 29, 1998

(51) Int. Cl.[7] ........................................................ H02H 3/05
(52) U.S. Cl. ................... 714/53; 711/118; 714/52
(58) Field of Search ..................... 711/118, 145, 711/156, 163, 173, 205, 220, 221; 714/6, 52, 53, 54

(56) References Cited

U.S. PATENT DOCUMENTS

| | | | |
|---|---|---|---|
| 4,483,003 | 11/1984 | Beal | 371/51 |
| 5,345,582 | * 9/1994 | Tauchiya | 714/53 |
| 5,404,467 | * 4/1995 | Saba et al. | 712/207 |
| 5,479,641 | 12/1995 | Nadir et al . | 395/455 |
| 5,509,119 | 4/1996 | La Fetra | 395/185.05 |
| 5,784,394 | 7/1999 | Alvarez, II et al. | 371/49.1 |
| 5,832,250 | 11/1998 | Whittaker | 395/471 |
| 5,875,201 | 2/1999 | Bauman et al. | 371/49.1 |

* cited by examiner

*Primary Examiner*—Hiep T. Nguyen
(74) *Attorney, Agent, or Firm*—David J. Kaplan

(57) ABSTRACT

A method and apparatus for performing cache accesses. A comparator is coupled to a cache and a lookup parity bit line to perform error detection.

11 Claims, 4 Drawing Sheets

METHOD AND APPARATUS FOR PERFORMING CACHE ACCESSES

The present invention relates to computer systems and more particularly to accessing a cache with parity bit error detection.

BACKGROUND

Computer systems, from handheld electronic devices to medium-sized mobile and desktop systems to large servers and workstations, are becoming increasingly pervasive in our society. Each computer system includes one or more processors. A processor manipulates and controls the flow of data in a computer. Decreasing the size of the processor will tend to decrease its manufacturing cost. Improving processor reliability tends to improve the overall quality of the computer. Processor designers employ many different techniques to decrease processor size and to improve reliability to create less expensive and more robust computers for consumers.

One reliability problem arises from occurrences known as soft errors. A soft error is a situation in which a bit is set to a particular value in the processor and spontaneously changes to the opposite value (e.g. from a logical "1" to a logical "0", or vice-versa), thereby corrupting the associated data. A soft error may be caused by cosmic rays passing through a storage element within the processor, charging or discharging the storage element, thereby causing a stored bit to change its value.

As processor supply voltages continue to be reduced in an effort to lower processor power consumption, the difference in voltage values that define the 1's and 0's of bits is reduced as well. This makes processors more susceptible to soft errors. In addition, as storage elements become more densely packed within processors, the likelihood of a soft error increases.

One way to combat soft errors is through the use of error correction or error detection bits. The most common type of error correction and error detection bits are parity bits. One type of parity bit works by indicating whether the number of bits with a logical value of 1 is odd or even in a given data value. For example, for a 64 bit value containing 22 bits with a value of 0 and 42 bits with a value of 1, the parity bit is set to 0 (assuming even parity), indicating that the associated 64 bit data structure contains an even number of bits with a value of 1. If the processor transfers or stores this 64 bit value with parity checking, 65 bits are actually transferred or stored, the original 64 bit value plus the parity bit.

If a soft error occurs to any one bit of the 64 bits during transfer or storage, it can be detected by the processor. For example, if a bit with a value of 0 flips to a 1 by soft error, the 64 bit value would then contain 21 bits with a value of 0 and 43 bits with a value of 1. By performing a parity check on the 64 bit value, the soft error is detected because the odd number of bits with a value of 1 no longer agrees with the previously set parity bit corresponding to an even number of bits having a value of 1. Upon detecting the soft error, the processor may regenerate the original 64 bit value to preserve the integrity of the data.

One area where soft errors are of particular concern is in the cache. A cache is storage space located close to the processor, or in some cases within the processor, for fast data access by the processor. The processor finds data inside the cache by matching a portion of a desired data address, called a lookup tag, to the same portion of a data address stored in the cache, called a cache tag.

If a cache tag is found that matches the lookup tag, this is referred to as a hit, and the associated data is assumed to be the data desired by the processor. In the presence of soft errors, however, it is possible for a lookup tag to match two cache tags. For example, a lookup tag may match a first cache tag associated with the desired data, and a second cache tag that has been corrupted by a soft error to look identical to the first tag.

To handle the occurrence of multiple hits, processor designers have designed parity check circuitry into their caches. Parity bits are generated and stored with their associated tags in the cache. In the event two cache tags match a single lookup tag, the two cache tags are parity checked against their associated parity bits to determine which of the two tags is corrupted and which is the true match. Unfortunately, the circuits necessary to accommodate multiple hits and to perform parity checking in this manner are large and complex, increasing processor size and power consumption.

SUMMARY OF THE INVENTION

A method and apparatus for performing cache accesses is described. A comparator is coupled to a cache and a lookup parity bit line.

Other features and advantages of the present invention will be apparent from the accompanying drawings and the detailed description that follows.

BRIEF DESCRIPTION OF THE DRAWINGS

The present invention is illustrated by way of example and not limitation in the figures of the accompanying drawings in which like references indicate similar elements and in which.

DETAILED DESCRIPTION

In accordance with an embodiment of the present invention, parity bit checking is done before or during the comparison between a lookup tag and a cache tag in a cache. By performing parity bit checking before or during the lookup tag and cache tag comparisons, multiple matches between a single lookup tag and two or more cache tags are less likely to occur because corrupted cache tags that have suffered a soft error are removed from the tag comparison process. As a result, it is not necessary to include the complex circuitry previously used to handle multiple hits.

Parity bit checking is done by generating and comparing a parity bit associated with the lookup tag with a parity bit associated with the cache tag. For one embodiment of the present invention, the parity bit generator used to generate the cache parity bit is also used to generate the lookup parity bit. For another embodiment, the lookup parity bit is stored with the lookup tag in a buffer, such as the translation buffer. The lookup parity bit and lookup tag are compared to the cache parity bit and cache tag, respectively. If the tags match but the parity bits do not, then the cache tag is assumed to be corrupted (due to, for example, a soft error), and a cache miss occurs. A corrupted tag may be either evicted from or invalidated in the cache.

A more detailed description of embodiments of the present invention, including various configurations and implementations, is provided below. The term "cache" is used to denote any storage space or plurality of storage spaces in which cache tags and other cache-related information are stored. For example, both a cache tag RAM located in a storage space apart from its associated data storage space and a cache having an integrated tag and data storage space are referred to as cache. The term "data" is used herein to describe data, instructions, addresses, or any other information that can be represented by one or more bits transferred or stored within a computer system. The term "parity bit" indicates any of one or more bits of an error correction or error detection method, including odd and even parity bit checking for single, double, or any number of bit errors associated with data of any bit length.

Figure 1:
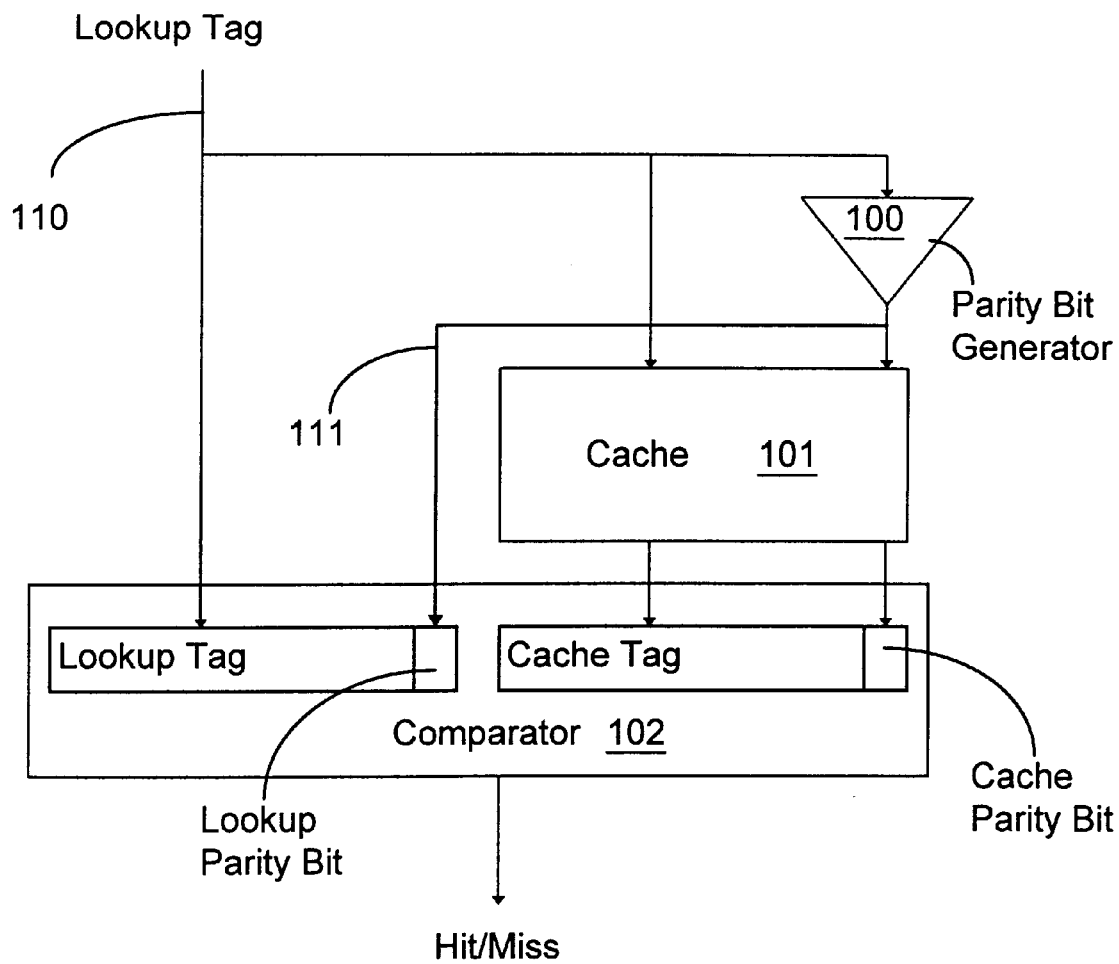
FIG. 1 is a circuit formed in accordance with an embodiment of the present invention.

FIG. 1 is a circuit formed in accordance with an embodiment of the present invention in which lookup tag bus 110 is coupled to the inputs of parity bit generator 100, cache 101, and comparator 102. The output of parity bit generator 100 is coupled to the input of cache 101 and, by way of lookup parity bit line 111, to the input of comparator 102. The output of cache 101 is coupled to the input of comparator 102. The output of comparator 102 indicates whether or not there is a hit or miss in the cache. The circuit of FIG. 1 may be internal or external to a processor of a computer system. If located externally, the circuit may reside within an external cache.

When some portion of a processor, such as the execution unit, needs to store data in a cache, an address tag associated with the data is generated and transferred along lookup tag bus 110 of FIG. 1. This address tag is provided to the input of parity bit generator 100 and to the input of cache 101. Parity bit generator 100 generates a parity bit associated with the address tag, and both the parity bit and its associated address tag are stored in cache 101. Because the parity bit and its associated address tag are stored in cache 101, and are subsequently retrieved from cache 101 as described below, the parity bit and tag are referred to as the cache parity bit and cache tag, respectively.

Cache 101 of FIG. 1 includes storage space for both the cache parity bit and its associated cache tag. For one embodiment of the present invention, cache 101 is fully associative. For this embodiment, the cache tag and cache parity bit may be stored anywhere within the available storage space of cache 101. For an alternate embodiment of the present invention, cache 101 is multi-way set associative. For this embodiment, the cache tag and cache parity bit may be stored in either of two or more ways within a selected set of the cache. The cache set is selected by an index portion of the address associated with the cache tag. Index selection circuitry is understood to those skilled in the art and has not been shown in the figures to avoid obscuring the present invention.

When the processor requests data from cache 101, a lookup tag associated with the address of the requested data is generated by the processor and transferred along lookup tag bus 110 of FIG. 1. This lookup tag is provided to the input of parity bit generator 100 and comparator 102. Parity bit generator 100 uses the lookup tag to generate a lookup parity bit associated with the lookup tag. The lookup parity bit is transferred from parity bit generator 100 to comparator 102 via lookup parity bit line 111. In accordance with one embodiment of the present invention, parity bit generator 100 generates the lookup parity bit during the period of time that the proper set of cache 101 is selected for cache tag comparison, and the associated cache tag is provided to comparator 102.

Once the lookup tag, lookup parity bit, cache tag, and cache parity bit are provided to comparator 102 of FIG. 1, comparator 102 compares the data to determine if there is a hit or miss. Comparator 102 simultaneously compares the lookup tag and lookup parity bit to the cache tag and cache parity bit, respectively, to determine if the lookup tag matches (i.e. is equal to) the cache tag and to determine if the lookup parity bit matches the cache parity bit. If the lookup tag matches the cache tag and the lookup parity bit matches the cache parity bit, then there is a hit. Otherwise there is a miss.

For an alternate embodiment of the present invention, the comparator includes two or more components in which portions of data are separately compared. For example, for one embodiment, comparator 102 of FIG. 1 includes a first component that compares a lookup parity bit to a cache parity bit during a first stage, and a second component that subsequently compares the associated lookup and cache tags during a second stage. For another embodiment, the components separately compare data portions simultaneously.

In accordance with an embodiment of the present invention in which cache 101 of FIG. 1 is fully associative or multi-way set associative, a comparator coupled in a manner substantially similar to comparator 102 may be included for each of the multiple cache tags that are compared against the single lookup tag to identify a match. For example, two comparators are implemented in conjunction with a two-way set associative cache, one comparator to compare the lookup tag to the cache tags of each of the two ways of a selected cache set. The direct-mapped case is shown in the figures to avoid obscuring the present invention.

In accordance with an embodiment of the present invention, if the lookup tag matches the cache tag, but the lookup parity bit is not equal to the cache parity bit, this indicates that a soft error may have occurred in the cache tag. By comparing the parity bits in accordance with the present invention, a false hit due to the soft error is avoided. As a result, a miss is indicated, and the data requested by the processor is retrieved from a higher level cache or the main memory of the computer system. The erroneous cache tag may then be evicted or invalidated in the cache. If, however, the comparator indicates that the lookup tag and lookup parity bit match the cache tag and cache parity bit, respectively, this is a hit, and the data associated with the matching cache tag is transferred to the processor. For an alternate embodiment of the present invention in which multiple parity bits are associated with both the lookup and cache tags, all or a portion of the multiple parity bits are compared against one another for hit/miss detection.

If parity bit generator 100 is too slow, the overall speed of the computer system may be unacceptably reduced. This problem may be remedied by implementing an embodiment of the present invention in accordance with FIG. 2.

Figure 2:
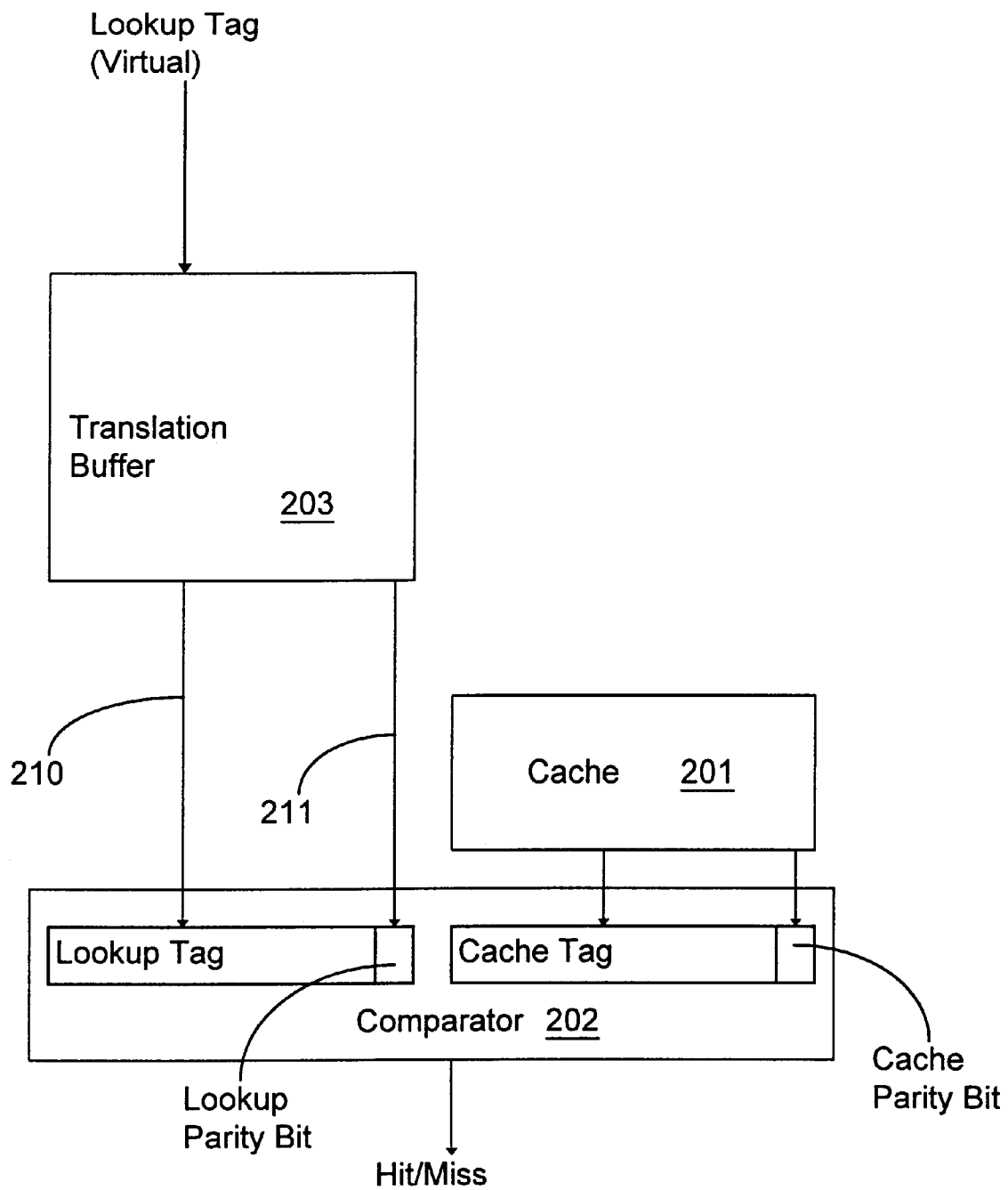
FIG. 2 is a circuit formed in accordance with an alternate embodiment of the present invention.

FIG. 2 is a circuit formed in accordance with an alternate embodiment of the present invention in which the lookup parity bit is stored in and retrieved from translation buffer 203 before being provided to comparator 202. A virtual lookup tag (that is, the tag portion of a virtual address) is provided to the input of translation buffer 203. One output of translation buffer 203 is coupled to the input of comparator 202 via lookup tag bus 210. Another output of translation buffer 203 is coupled to the input of comparator 202 via lookup parity bit line 211. The output of cache 201 is coupled to the input of comparator 202. The output of comparator 202 indicates whether or not there is a hit or miss in the cache. The circuit of FIG. 2 may be internal or external to a processor of a computer system. If located externally, the circuit may reside within an external cache. For an alternate embodiment of the present invention, a portion of the circuit of FIG. 2, for example, the translation buffer portion, is internal to a processor while another portion is external.

The circuit of FIG. 2 operates in much the same way as the circuit of FIG. 1, the primary difference being that the parity bits of FIG. 2 are pre-computed and stored in a buffer. For simplicity, only the case in which the processor requests the retrieval of data from the cache, as opposed to storing data in the cache, is described below in conjunction with FIG. 2.

To retrieve data stored in cache 201 of FIG. 2, a processor generates a virtual lookup tag associated with the virtual address of the requested data. This lookup tag is provided to translation buffer 203. Translation buffer 203 (sometimes called a translation lookaside buffer) translates the virtual lookup tag into a physical lookup tag. In addition, translation buffer 203 includes storage space to store a lookup parity bit associated with the physical lookup tag. In accordance with one embodiment of the present invention, this lookup parity bit is computed and stored in translation buffer 203 during a period when the generation of the lookup parity bit is not time critical.

Referring to FIG. 2, the lookup tag and its associated lookup parity bit are transferred from translation buffer 203 to comparator 202 via lookup tag bus 210 and lookup parity bit line 211, respectively. In this manner, the pre-computed lookup parity bit is almost immediately available to the comparator. For an alternate embodiment of the present invention, the lookup parity bit is computed and stored in a storage space other than the translation buffer. This parity bit is then transferred from the alternate storage space to the comparator when needed.

In accordance with one embodiment of the present invention, the appropriate set of cache 201 of FIG. 2 is selected by index lines (not shown) during the translation of the lookup tag from virtual to physical address space. A cache tag stored in a way of the selected set is transferred, along with its associated cache parity bit, to comparator 202.

Once the lookup tag, lookup parity bit, cache tag, and cache parity bit are provided to comparator 202 of FIG. 2, comparator 202 compares the data to determine if there is a hit or miss. As stated above in conjunction with FIG. 1, multi-way and fully associative caches contain two or more cache tags and associated cache parity bits to be compared to the lookup tag and lookup parity bit. The comparisons are accomplished by additional comparators configured in a similar manner to the comparator of FIG. 2.

The operation and meaningfulness of the output of comparator 202 of FIG. 2 is substantially the same as that described above in conjunction with comparator 102 of FIG. 1.

Figure 3:
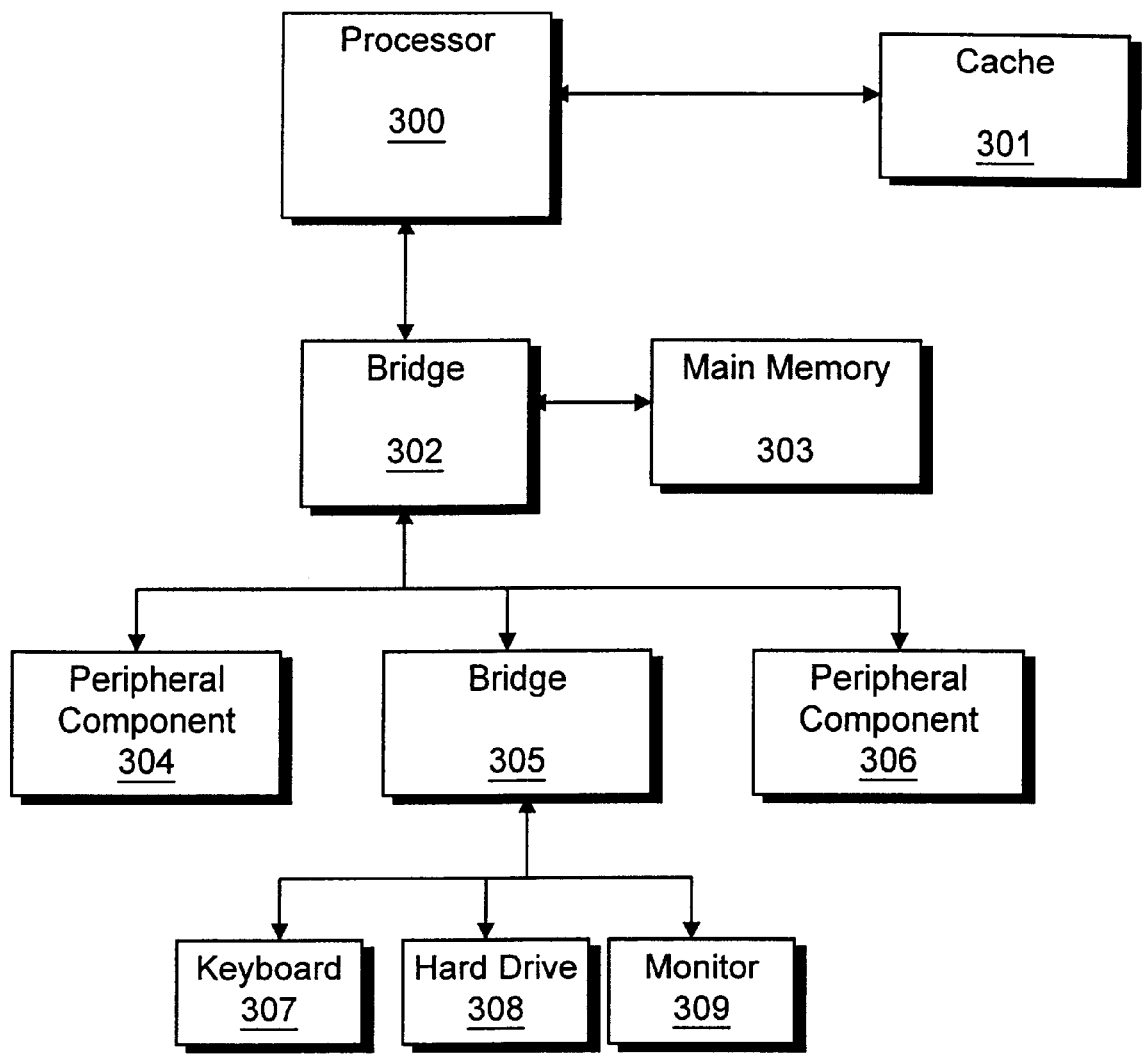
FIG. 3 is a computer system formed in accordance with one embodiment of the present invention.

FIG. 3 is a computer system formed in accordance with one embodiment of the present invention in which processor 300 is coupled to cache 301 and bridge 302. Bridge 302 couples processor 300 to main memory 303 and to the components coupled to the peripheral bus, enabling communication between the processor, main memory, and the peripheral components. The components coupled to the peripheral bus include peripheral component 304, peripheral component 306, and bridge 305, to which keyboard 307, hard drive 308, and monitor 309 are coupled.

As stated above, all or a portion of the circuits of FIGS. 1 and 2 may be internal to processor 300 of the computer system of FIG. 3, or may reside external to processor 300, such as within external cache 301. As stated above, a cache miss may occur due to a soft error causing a cache parity bit to be unequal to a lookup parity bit even though the cache tag matches the lookup tag. On such a cache miss, the processor accesses another region of memory to locate the desired data.

For example, if a miss occurs in an internal cache, the processor may access the desired data from external cache 301. If a miss occurs in external cache 301, the processor may access the desired data from main memory 303. If not found in main memory 303, the desired data may be loaded into main memory or a cache from hard drive 308. For an alternate embodiment, the desired data may be loaded into main memory or a cache from either peripheral component 304 or 306. For example, if the desired data is audio data, and peripheral component 304 is a sound card, peripheral component 304 may provide the desired data via bridge 302. As another example, if the desired data is video data, and peripheral component 306 is a video card, peripheral component 306 may provide the desired data via bridge 302. Alternatively, keyboard 307 may be used to provide the desired data by hand.

Figure 4:
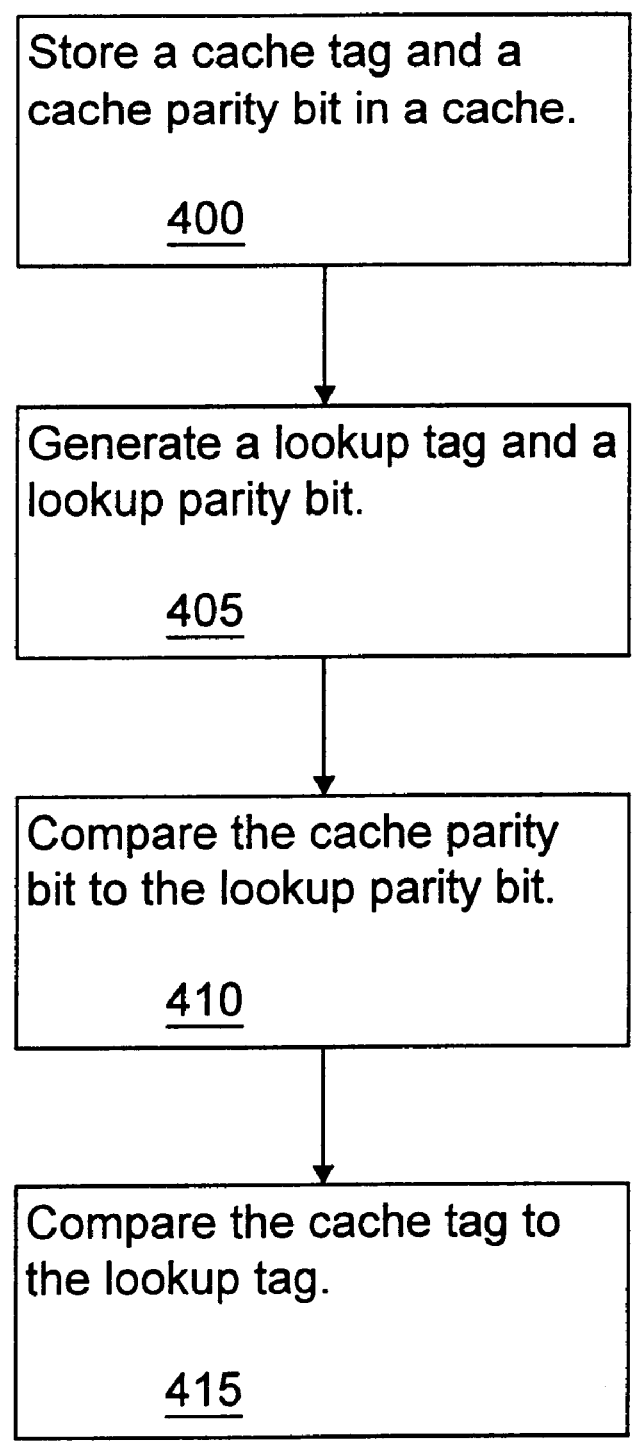
FIG. 4 is a flow chart showing a method of an embodiment of the present invention.

FIG. 4 is a flow chart showing a method of the present invention. At step 400, a cache tag an its associated cache parity bit are stored in a cache. At step 405, a lookup tag and a lookup parity bit are generated. For one embodiment of the present invention, the lookup parity bit is generated by the same parity bit generator used to generate the cache parity bit. Alternatively, the lookup parity bit is pre-computed and stored in a buffer for quick retrieval. At step 410, the cache parity bit is compared to the lookup parity bit to determine if there is a match. At step 415, the cache tag is compared to the lookup tag to determine if there is a match. For one embodiment of the present invention, steps 410 and 415 are implemented in separate stages or simultaneously.

This invention has been described with reference to specific exemplary embodiments thereof. It will, however, be evident to persons having the benefit of this disclosure that various modifications and changes may be made to these embodiments without departing from the broader spirit and scope of the invention. The specification and drawings are, accordingly, to be regarded in an illustrative rather than a restrictive sense.

What is claimed is:

1. A circuit comprising:
   a translation buffer having storage space to store both a lookup tag and a lookup parity bit associated with the lookup tag;
   a cache having storage space to store both a cache tag and a cache parity bit associated with the cache tag; and
   a comparator coupled to the cache and to the translation buffer, the comparator including a first component to compare a lookup parity bit from the translation buffer to a cache parity bit from the cache to detect a hit or miss.

2. The circuit of claim 1, wherein the comparator comprises:
   a second component to compare a lookup tag from the translation buffer to a cache tag from the cache to detect the hit or miss.

3. A processor comprising:
   a cache to store a cache tag and a cache parity bit associated with the cache tag;
   a translation buffer to store a lookup tag and a lookup parity bit associated with the lookup tag; and a comparator coupled to the cache and the translation buffer, the comparator to determine if the cache parity bit is equal to the lookup parity bit.

4. The processor of claim 3, wherein the cache includes the cache tag and the cache parity bit stored therein, and the translation buffer includes the lookup tag and the lookup parity bit stored therein.

5. The processor of claim 3, further comprising a parity bit generator having an output coupled to the translation buffer, the parity bit generator to generate the lookup parity bit, the translation buffer to store the lookup parity bit.

6. A computer system comprising:

a processor to generate a virtual lookup tag;

a translation buffer, coupled to the processor, to store a physical lookup tag associated with the virtual lookup tag and to further store a lookup parity bit associated with the physical lookup tag;

a cache, coupled to the processor, to store a cache tag that matches the physical lookup tag and to further store a cache parity bit associated with the cache tag;

a comparator to compare the cache parity bit associated with the cache tag to the lookup parity bit associated with the physical lookup tag; and main memory, coupled to the processor, to be accessed if the cache parity bit and the lookup parity bit are unequal.

7. The computer system of claim 6, wherein the cache and the comparator are internal to the processor.

8. The computer system of claim 6, wherein the cache and the comparator are external to the processor.

9. A method of accessing a cache in a computer system, comprising:

storing a lookup tag and a lookup parity bit associated with the lookup tag in a translation buffer;

storing a cache tag and a cache parity bit associated with the cache tag in the cache; and comparing the cache parity bit to the lookup parity bit.

10. The method of claim 9, further comprising comparing the cache tag to the lookup tag while comparing the cache parity bit the lookup parity bit, and indicating a cache hit if both the cache parity bit matches the lookup parity bit and the cache tag matches the lookup tag.

11. The method of claim 10, further comprising indicating a cache miss if either the cache parity bit is unequal to the lookup parity bit, or the cache tag is unequal to the lookup tag.

* * * * *